Patented Mar. 23, 1954

2,673,158

UNITED STATES PATENT OFFICE 2,673,158

METHOD OF AND COMPOSITION FOR THE PROTECTION OF GRAIN

Elemer Klein, Tel-Aviv, Israel

No Drawing. Application January 29, 1952,
Serial No. 268,920

5 Claims. (Cl. 99—153)

This invention concerns the protection of stored wheat and other grain.

One of the most dangerous pests for stored grain is the weevil (Calandra, especially *C. granaria*) which works ravages up to 2% yearly. In addition to the actual destruction of grain, the evil smell caused by the excretions of the weevil makes the bulk of the remaining grain virtually unusable. Countless efforts have been made to combat the weevil, most of them without notable success. Where known protecting methods involve the use of various chemicals in gaseous, liquid or solid form they spoil the grain by bad odour and are also liable to endanger the health of the attendants.

The present invention provides a new method of and means for protecting stored grain against weevils, and incidentally also against flour beetles (Tribolium, especially *Tr. ferrugineum*).

It is known that some kinds of glassy volcanic rock, e. g. perlite, can be made to expand, by careful heating to high temperatures, to a lightweight cellular material 10 to 20 times the original volume. A similar property is possessed by certain kinds of clay not suited for ceramic purposes. It has now been found that in a mixture composed of grain and mineral flour obtained by grinding the aforesaid lightweight material to a degree of fineness so that it passes through sieves from about 5,000 to 10,000 meshes per sq. centimeter without leaving on the sieve more than 2% residue, weevils and flour beetles feed preferentially on the mineral flour and leave the grain virtually intact. After a short time the weevils and flour beetles are extirpated by the consumption of the mineral flour. The deadly effect of the mineral flour on the weevils and beetles does not appear to be poisonous in the proper sense of the word but rather a mechanical destruction of the gastro-intestinal tracts, as the pests can neither digest the mineral flour nor excrete it again. This latter circumstance also accounts for the fact that the bad smell otherwise produced by weevils in grain stores attacked by them does not occur in grain protected in accordance with this invention.

A suitable proportion of the mineral flour in its mixture with the grain is of the order of, for example, 1 to 4% by weight.

When the grain is removed from the store the mineral flour can be removed easily by sifting, airelutriation or in any other suitable way.

I claim:

1. A mixture adapted to be stored and to resist spoiling by weevils, including cereal grain and from 1 to 4% by weight of heat-expanded perlite ground into a flour of a fineness such as to pass through a sieve of from 5,000 to 10,000 meshes per square centimeter without leaving on the sieve more than 2% residue.

2. A method of preparing cereal grain for storage, comprising admixing to the grain a heat-expanded mineral selected from the group consisting of perlite, and heat-expandable clay, ground to a fineness such as to pass through a sieve of 5,000 to 10,000 meshes per square centimeter without leaving on the sieve more than 2% residue.

3. A method as claimed in claim 2, wherein the proportion of mineral flour is from 1 to 4% by weight of the mixture.

4. A method of preparing cereal grain for storage comprising admixture to the grain from 1 to 4% by weight of the mixture of heat-expanded perlite ground into a flour of a fineness such as to pass through a sieve of 5,000 to 10,000 meshes per square centimeter without leaving on the sieve more than 2% residue.

5. A mixture adapted to be stored and to resist spoiling by weevils, including cereal grain and mineral flour obtained by grinding heat-expanded rock of the group consisting of perlite and heat-expandable clay to a degree of fineness such as to pass through a sieve from 5,000 to 10,000 meshes per square centimeter without leaving on the sieve more than 2% residue.

ELEMER KLEIN.

References Cited in the file of this patent

UNITED STATES PATENTS

| Number | Name | Date |
|---|---|---|
| 2,434,204 | Feachem | Jan. 6, 1948 |

OTHER REFERENCES

"A Simple Method of Protecting Cereals and Other Stored Foodstuffs Against Insect Pests," by Kitchener et al., Chemistry and Industry, January 23, 1943, pages 32 and 33.